United States Patent
Hariki et al.

(10) Patent No.: US 7,406,362 B2
(45) Date of Patent: Jul. 29, 2008

(54) WORKPIECE REGRASPING SYSTEM FOR ROBOT

(75) Inventors: Kazuo Hariki, Yamanashi (JP);
Kazuhisa Otsuka, Yamanashi (JP);
Masaru Oda, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 876 days.

(21) Appl. No.: 10/932,286

(22) Filed: Sep. 2, 2004

(65) Prior Publication Data
US 2005/0065654 A1   Mar. 24, 2005

(30) Foreign Application Priority Data
Sep. 4, 2003   (JP) ............ 2003-312531

(51) Int. Cl.
  *H01L 21/68* (2006.01)
  *G05B 19/18* (2006.01)
  *B21C 49/00* (2006.01)
  *G06F 19/00* (2006.01)

(52) U.S. Cl. ............ 700/256; 700/245; 414/783; 414/784; 901/31; 901/45

(58) Field of Classification Search ............ 700/245, 700/256, 214, 217, 302; 414/776, 783, 784, 414/816, 936, 941; 100/152; 901/35, 46, 901/47
See application file for complete search history.

(56) References Cited
U.S. PATENT DOCUMENTS

| | | | | |
|---|---|---|---|---|
| 4,146,924 A | * | 3/1979 | Birk et al. | 700/259 |
| 4,844,678 A | * | 7/1989 | Schenk | 414/223.01 |
| 6,074,164 A | * | 6/2000 | Spencer et al. | 414/816 |
| 6,243,621 B1 | * | 6/2001 | Tao et al. | 700/245 |
| 2001/0054223 A1 | * | 12/2001 | Yamanashi et al. | 29/563 |

* cited by examiner

*Primary Examiner*—Thomas G. Black
*Assistant Examiner*—Christine M Behncke
(74) *Attorney, Agent, or Firm*—Drinker Biddle & Reath LLP (57) ABSTRACT

A workpiece regrasping system for a robot. The system includes a manipulator grippable a workpiece; a deck member having a deck surface on which a workpiece is placeable; a support mechanism rotatably supporting the deck member about an axis parallel to the deck surface; a workpiece-orientation control section for controlling the manipulator so as to grip a workpiece at a first point of the workpiece and to bring the workpiece into abutment with the deck surface of the deck member, and configured to displace the workpiece together with the deck member about the axis, while maintaining a mutually abutted condition, until the workpiece occupies a desired orientation, with at least a part of a weight of the workpiece being carried on the deck surface; and a regrasping control section for controlling the manipulator so as to temporarily release the workpiece placed on the deck surface in the desired orientation and to regrasp the workpiece at a second point different from the first point. The workpiece-orientation control section may control an operation of the manipulator, or control a rotational drive section for the deck member, while maintaining the workpiece in abutment with the deck surface, to displace the workpiece to the desired orientation.

5 Claims, 8 Drawing Sheets

WORKPIECE REGRASPING SYSTEM FOR ROBOT

BACKGROUND OF THE INVENTION

1. Field of the Invention

The present invention relates to a workpiece regrasping system for a robot.

2. Description of the Related Art

In a configuration wherein a robot performs handling of a workpiece, there is a case, as in the orientation of a workpiece which should be gripped or held by a hand (or a workpiece orientation), where the workpiece orientation desired by the robot does not coincide with an actual workpiece orientation provided at an actual working site (such as, the orientation of the workpiece placed on a predetermined jig, or the orientation of the workpiece fed from a machine tool). For example, in an operation for picking up a workpiece by a hand and placing it on a pallet, such an inconvenience may occur that an actual workpiece orientation just before a picking-up step is different from a desired workpiece orientation on a pallet on which the workpiece is placed (e.g., the difference of a 90° orientation, between the vertical and horizontal orientations of a rectangular parallelepiped body).

In such a case, it is required for the robot to perform the handling of the workpiece (e.g., the transfer of the workpiece to the pallet) after the actual workpiece orientation is changed to the desired workpiece orientation. If the workpiece is light in weight, it is possible for the robot performing a handling operation to previously change the actual workpiece orientation to the desired workpiece orientation by the handling operation and then to pick up the workpiece placed in the desired orientation. However, if the workpiece is heavy, such as a large-sized motor or an engine component, the handling operation for changing the workpiece orientation generally applies an excessively large load to a wrist of the robot, so that it is difficult, in practice, for the robot to change the workpiece orientation. Conventionally, simple and effective countermeasures against this problem have not yet been proposed.

SUMMARY OF THE INVENTION

It is an object of the present invention to provide a workpiece regrasping system for a robot, which allows the robot to perform the handling of a workpiece while changing an actual workpiece orientation to a desired workpiece orientation, without applying an excessively large load to the wrist of the robot, even when the objective workpiece is heavy in weight.

To accomplish the above object, the present invention provides a workpiece regrasping system for a robot, comprising a manipulator capable of gripping a workpiece; a deck member having a deck surface on which a workpiece is able to be placed; a support mechanism supporting the deck member in a rotatable manner about an axis parallel to the deck surface; a workpiece-orientation control section for controlling the manipulator so as to grip a workpiece at a first point of the workpiece and to bring the workpiece gripped by the manipulator into abutment with the deck surface of the deck member, the workpiece-orientation control section being configured to displace the workpiece together with the deck member about the axis, while maintaining a mutually abutted condition, until the workpiece occupies a desired orientation, with at least a part of a weight of the workpiece being carried on the deck surface; and a regrasping control section for controlling the manipulator so as to temporarily release the workpiece placed on the deck surface in the desired orientation and thereafter to regrasp the workpiece at a second point different from the first point.

In the above workpiece regrasping system, the workpiece-orientation control section may control an operation of the manipulator, while maintaining the workpiece in abutment with the deck surface, to displace the workpiece to the desired orientation.

Also, the support mechanism may include a retaining member capable of releasably retaining the deck member at a certain rotational position; and the workpiece-orientation control section may control an operation of the retaining member, while maintaining the workpiece in abutment with the deck surface, to retain the deck member at a rotational position at which the workpiece reached the desired orientation.

Also, the support mechanism may include a drive section for driving the deck member for rotation about the axis; and the workpiece-orientation control section may control an operation of the drive section, while maintaining the workpiece in abutment with the deck surface, to displace the workpiece to the desired orientation.

The workpiece regrasping system may comprise a plurality of manipulators, the workpiece-orientation control section may control the plurality of manipulators so as to grip a single workpiece and displace the single workpiece to the desired orientation; and the regrasping control section may control each of the plurality of manipulators so as to regrasp the single workpiece.

BRIEF DESCRIPTION OF THE DRAWINGS

The above and other objects, features and advantages of the present invention will become more apparent from the following description of preferred embodiments in connection with the accompanying drawings, wherein.

DETAILED DESCRIPTION

The embodiments of the present invention are described below in detail, with reference to the accompanying drawings. In the drawings, the same or similar components are denoted by common reference numerals.

Figure 1:
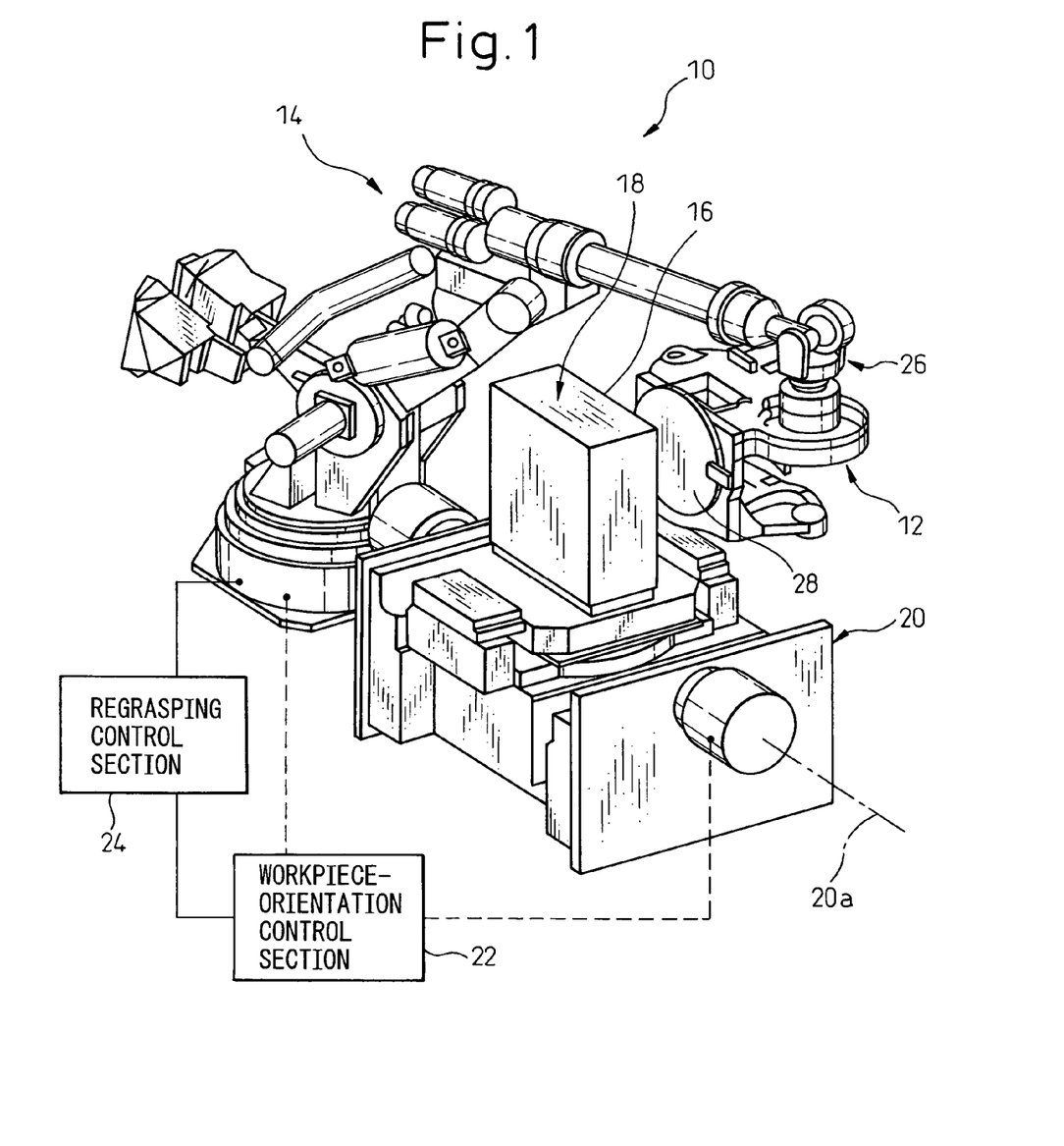
FIG. 1 is a schematic perspective view showing one example of a mechanical part of a workpiece regrasping system according to the present invention, with a basic configuration of the workpiece regrasping system being partially shown by a functional block diagram.

Referring to the drawings, FIG. 1 illustrates a basic structure of a workpiece regrasping system 10 for a robot, according to the present invention, together with one structural example of a mechanical part thereof. The workpiece regrasping system 10 includes a manipulator (or a mechanical part of a robot) 14 capable of gripping a workpiece 12; a deck member 18 having a deck surface 16 (FIG. 3) on which a workpiece 12 is able to be placed; a support mechanism 20 supporting the deck member 18 so as to be rotatable about an axis 20a extending parallel to the deck surface 16; a workpiece-orientation control section 22 for controlling the manipulator 14 so as to grip a workpiece 12 and to bring the workpiece 12 gripped by the manipulator 14 into abutment with the deck surface 16 of the deck member 18, the workpiece-orientation control section 22 being configured to displace the workpiece 12 together with the deck member 18 about the axis 20a, while maintaining a mutually abutted condition, until the workpiece 12 occupies a desired orientation, with at least a part of a weight of the workpiece 12 being carried on the deck surface 16; and a regrasping control section 24 for controlling the manipulator 14 so as to regrasp the workpiece 12 placed on the deck surface 16 in the desired orientation.

The manipulator 14, also referred to as a handling robot, is operable to grip or hold a workpiece 12 by a hand 26 attached to a wrist portion, and, e.g., to transfer the workpiece 12 placed on a predetermined jig (not shown) to a pallet (not shown) so as to place the workpiece onto the pallet. In the illustrated exemplary mechanism, the hand 26 is of a type capable of gripping or holding a heavy article with a chuck (not shown). For example, the workpiece 12 is a heavy-weight large-sized motor, and includes a portion 28 containing a generally flat surface (hereinafter referred to as a flat portion 28). The flat portion 28 functions as a bottom to be at least partially abutted to the pallet when the workpiece 12 is placed on the pallet. Accordingly, in the case where the actual workpiece orientation, when the manipulator 14 picks up the workpiece 12 from a jig, a machine tool or a workpiece container, is an orientation, as shown in FIG. 1, wherein the flat portion 28 is laterally oriented, it is desired to regrasp the workpiece 12 prior to a transferring step so as to grip or hold the workpiece 12 by the hand 26 in a workpiece orientation wherein the flat portion 28 is oriented downward, while maintaining a natural wrist orientation as illustrated (in other words, a wrist orientation following gravity).

The workpiece regrasping system 10 according to the present invention carries out such a workpiece regrasping process by using the deck member 18 which is an auxiliary unit disposed within the operating range of the manipulator 14, and thereby solves a problem of an excessively large load applied to a wrist shaft during a workpiece regrasping. The workpiece regrasping process according to the present invention will be described below in association with several embodiments shown in FIGS. 2 to 8B. In this regard, constituent parts in the respective embodiments corresponding to basic components shown in FIG. 1 are denoted by common reference numerals, and an explanation thereof is not repeated.

Figure 2:
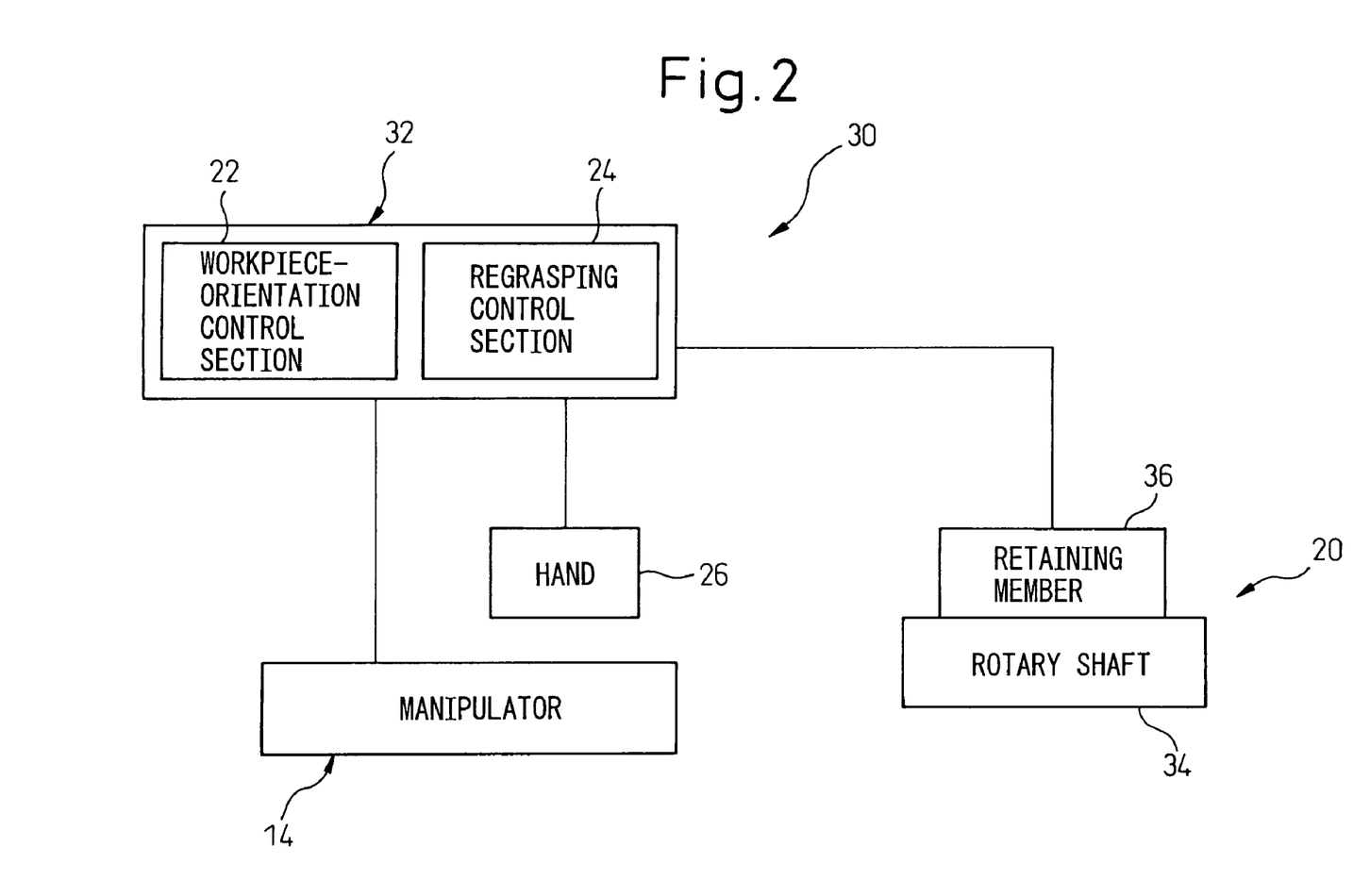
FIG. 2 is a block diagram showing a configuration of a workpiece regrasping system according to a first embodiment of the present invention.
Figure 3:
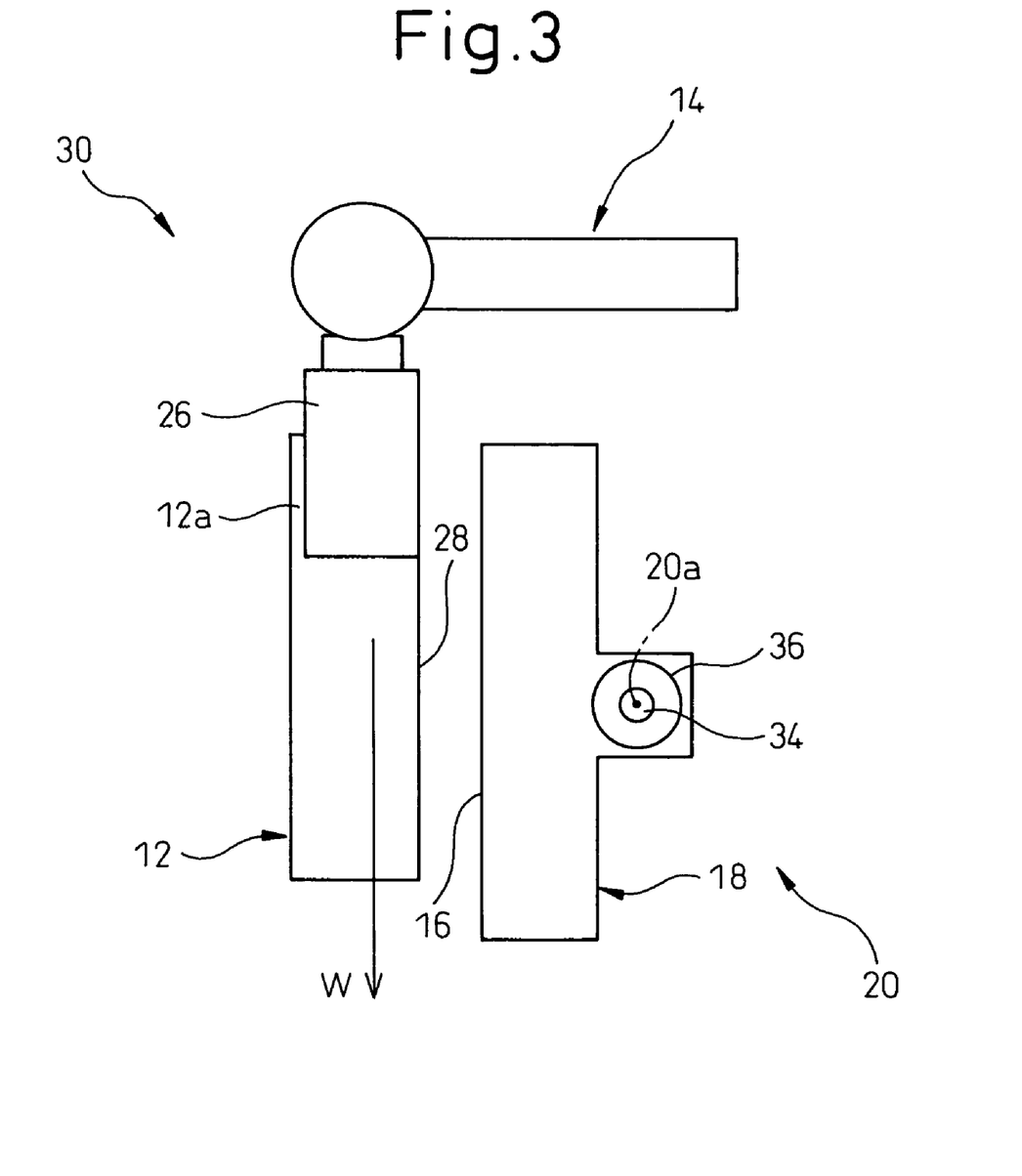
FIG. 3 is a typical illustration showing a positional relationship between a workpiece, a manipulator and a deck member, just before a workpiece regrasping process starts.

FIG. 2 illustrates a workpiece regrasping system 30 according to a first embodiment of the present invention. FIG. 3 illustrates a positional relationship between a workpiece 12, a manipulator 14 and a deck member 18, just before a workpiece regrasping process starts. FIGS. 4A to 4D illustrate the positional relationship between the workpiece 12, the manipulator 14 and the deck member 18 in a series of steps of the workpiece regrasping process.

In the workpiece regrasping system 30, the above-described workpiece-orientation control section 22 and the regrasping control section 24 are incorporated into a robot control unit 32 connected to the manipulator 14 (i.e., they may be constituted by a single CPU). The support mechanism 20 rotatably supports a rotary shaft 34 (having the axis 20a) integrally coupled with the deck member 19, and includes a retaining member 36 for releasably retaining the rotary shaft 34 at a certain rotational position. The robot control unit 32 (or the workpiece-orientation control section 22 and the regrasping control section 24) issues a control signal to respective control mechanisms so as to execute the operation control of the manipulator 14, the open/close control (i.e., the control of start and release of a gripping motion) of the hand 26, and the on-off control of the retaining member 36. In this embodiment, the rotary shaft 34 basically requires no drive source, but alternatively, the rotary shaft 34 may be connected to a suitable drive source. The retaining member 36 may be structured from a well-known brake or clutch.

Figure 4A:
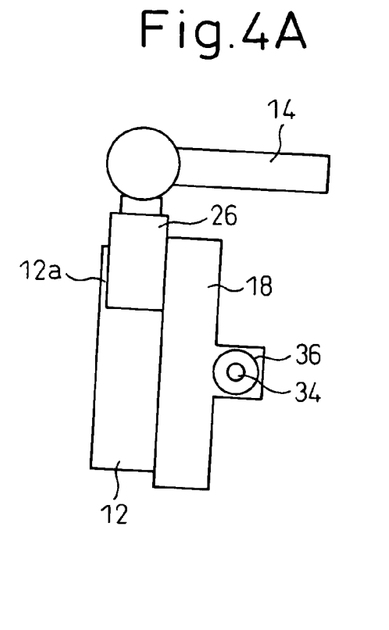
FIG. 4A is an illustration showing one step of the workpiece regrasping process, in which the workpiece is brought into abutment with the deck member.
Figure 4B:
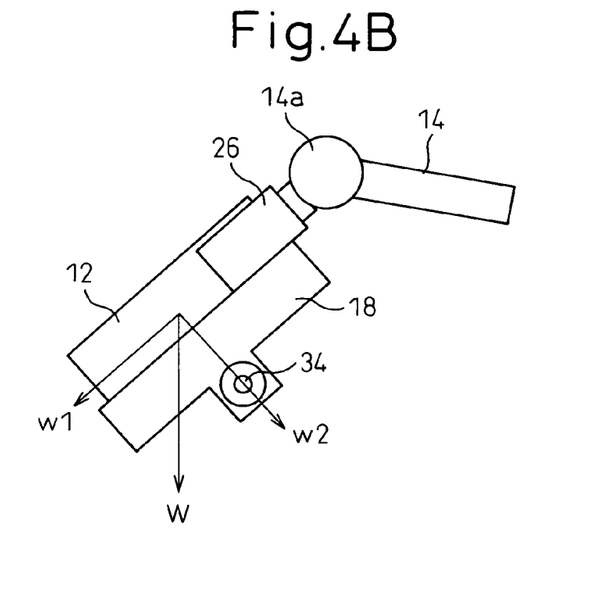
FIG. 4B is an illustration showing another step of the workpiece regrasping process, in which a workpiece orientation is varying while a part of a weight of the workpiece is carried by the deck member.
Figures 4C, 4D:
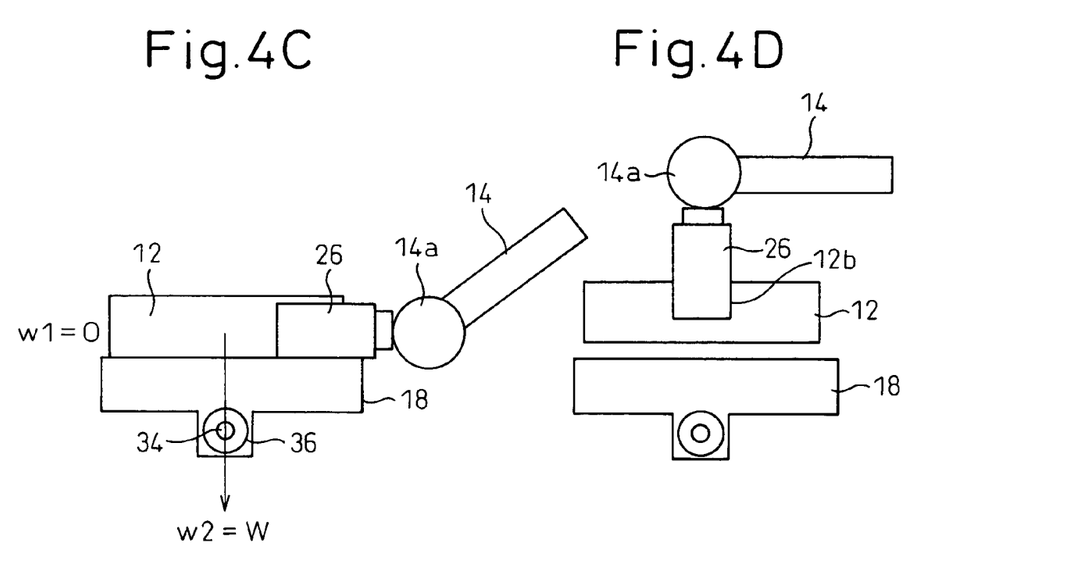
FIG. 4C is an illustration showing a further step of the workpiece regrasping process, in which the workpiece is located in a desired orientation.
FIG. 4D is an illustration showing a yet further step of the workpiece regrasping process, in which the workpiece is regrasped.
Figure 5:
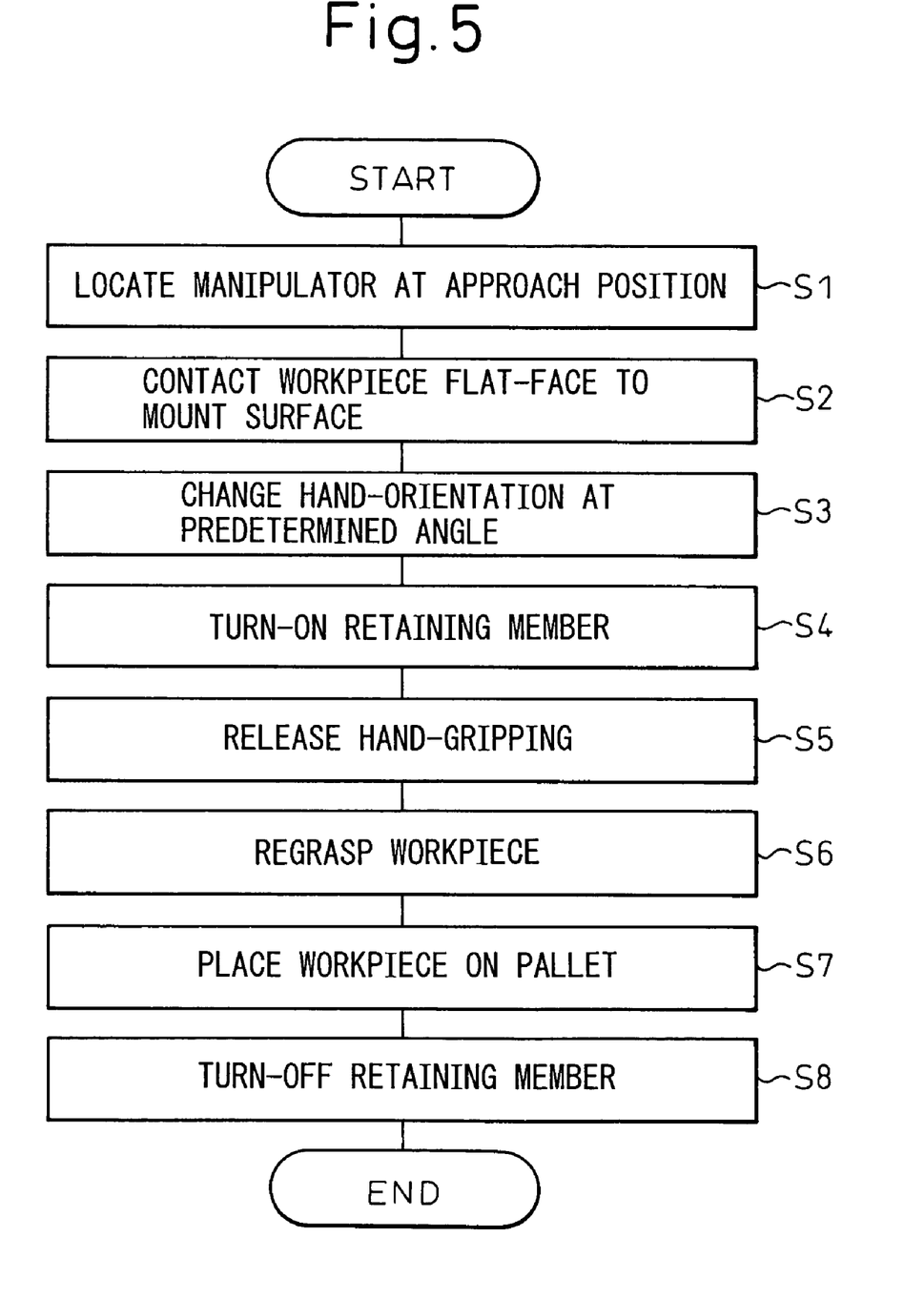
FIG. 5 is a flow chart illustrating a processing flow of the workpiece regrasping process in the workpiece regrasping system of FIG. 2.

The robot control unit 32 executes the workpiece regrasping process, in accordance with a flow chart shown in FIG. 5, after starting from an initial state shown in FIG. 3. The process flow of the workpiece regrasping process according to the first embodiment will be described below with reference to FIGS. 3, 4A to 4D. In this regard, it is possible to execute a series of steps in the flow chart shown in FIG. 5 by regenerating a program preliminarily taught to the robot control unit 32.

Step S1 ... [Workpiece-orientation control section 22] The manipulator 14 is controlled in operation so as to grip or hold the workpiece 12 at a first point 12a of the workpiece 12, and, in this gripping condition, the manipulator 14 is located at an approach position shown in FIG. 3 and the retaining member 36 of the support mechanism 20 is set in a released state. In this connection, the deck member 18 is formed in such a manner as to slightly shift the center of gravity thereof so that an initial position shown in FIG. 3 (i.e., a position at which the deck surface 16 is disposed parallel to the direction of gravity) becomes the most balanced position regarding gravity, and thereby the deck member 18 is automatically and stably held in the initial position during the period when the retaining member 36 is in the released state. Also, at the approach position, the manipulator 14 occupies such position and orientation that the flat portion 28 of the workpiece 12 gripped by the hand 26 is disposed in parallel to, and is spaced at a suitable distance from, the deck surface 16 of the deck member 18. In this condition, the entire weight W of the workpiece 12 is carried on the manipulator 14 as shown in FIG. 3.

Step S2 ... [Workpiece-orientation control section 22] The manipulator 14 is controlled in operation so as to bring the flat portion 28 of the workpiece 12 into abutment with the deck surface 16 of the deck member 18 in a mutually parallel state (FIG. 4A).

Step S3 . . . [Workpiece-orientation control section 22] The manipulator 14 is controlled in operation so as to gradually change the orientation of the hand 26 at a predetermined angle (FIG. 4B). As a result, the deck member 18 rotates in a passive manner about the rotary shaft 34 from the initial position. During this step, the flat portion 28 of the workpiece 12 is maintained in abutment with the deck surface 16, and thereby a load (or an applied force) caused by the entire weight W of the workpiece 12 is divided, as illustrated, into a component w1 carried by the manipulator 14 and a component w2 carried by the deck member 18. As the rotation angle of the deck member 18 is increased toward 90°, w1 is reduced toward 0 and w2 is increased toward W. Due to this backup motion of the deck member 18, it is possible to prevent a load (or a moment) applied to the wrist shaft 14a of the manipulator 14 from increasing.

Step S4 . . . [Workpiece-orientation control section 22] At an instant when the orientation of the hand 26 is changed to a predetermined angle (in the illustrated embodiment, 90°), it is judged that the workpiece 12 reaches a desired orientation, and thus the manipulator 14 is halted (or positioned). Thereafter, a turn-on signal is issued to the retaining member 36 so as to retain the rotary axis 34 at the above rotational position (FIG. 4C).

Step S5 . . . [Regrasping control section 24] The manipulator 14 is controlled so as to release the gripping motion of the hand 26 and thus to temporarily release the workpiece 12 placed on the deck surface 16 in the desired orientation. In this state, the weight of the workpiece 12 carried on the manipulator 14 is zero (w1=0), and the weight of the workpiece 12 carried on the deck member 18 is the entire weight (w2=W) (FIG. 4C).

Step S6 . . . [Regrasping control section 24] The manipulator 14 is controlled so as to once move the hand 26 away from the workpiece 12, to change the orientation of the hand 26, and to regrasp the workpiece 12 at a second point 12b of the workpiece 12 different from the first point 12a in such a manner that the workpiece 12 occupies a desired orientation different by 90° from a workpiece orientation at the approach position of FIG. 3 (FIG. 4D). Thus, the workpiece-orientation regrasping process is completed.

Step S7 . . . The manipulator 14 is controlled in operation so as to transfer the workpiece 12 to the pallet and place the workpiece 12 on the pallet.

Step S8 . . . After the manipulator 14 is spaced apart from the deck member 18 by a predetermined distance, the retaining operation of the retaining member 36 is released (or turned-off). Thereby, the deck member 18 automatically returns to the initial position (FIG. 3).

In the above embodiment, the rotary shaft 34 provided in the deck member 18 rotates in accordance with the hand-orientation changing operation of the manipulator 14 (in other words, the driving force of the rotary shaft 34 is given from the manipulator 14 via the deck member 18), but alternatively, the rotary shaft 34 of the deck member 18 may rotate in a positive manner under a driving force of an exclusive drive source. In this alternative case, while a drive mechanism having a servomotor for driving the rotary shaft 34 may be provided separately from a robot control system, it is also possible to drive the rotary shaft 34 by an additional control axis (or a control axis other than the control axes of the manipulator 14) in the robot control system. The configuration of a workpiece regrasping system 40 having the latter structure, which is a second embodiment of the present invention, will be described below with reference to FIG. 6.

Figure 6:
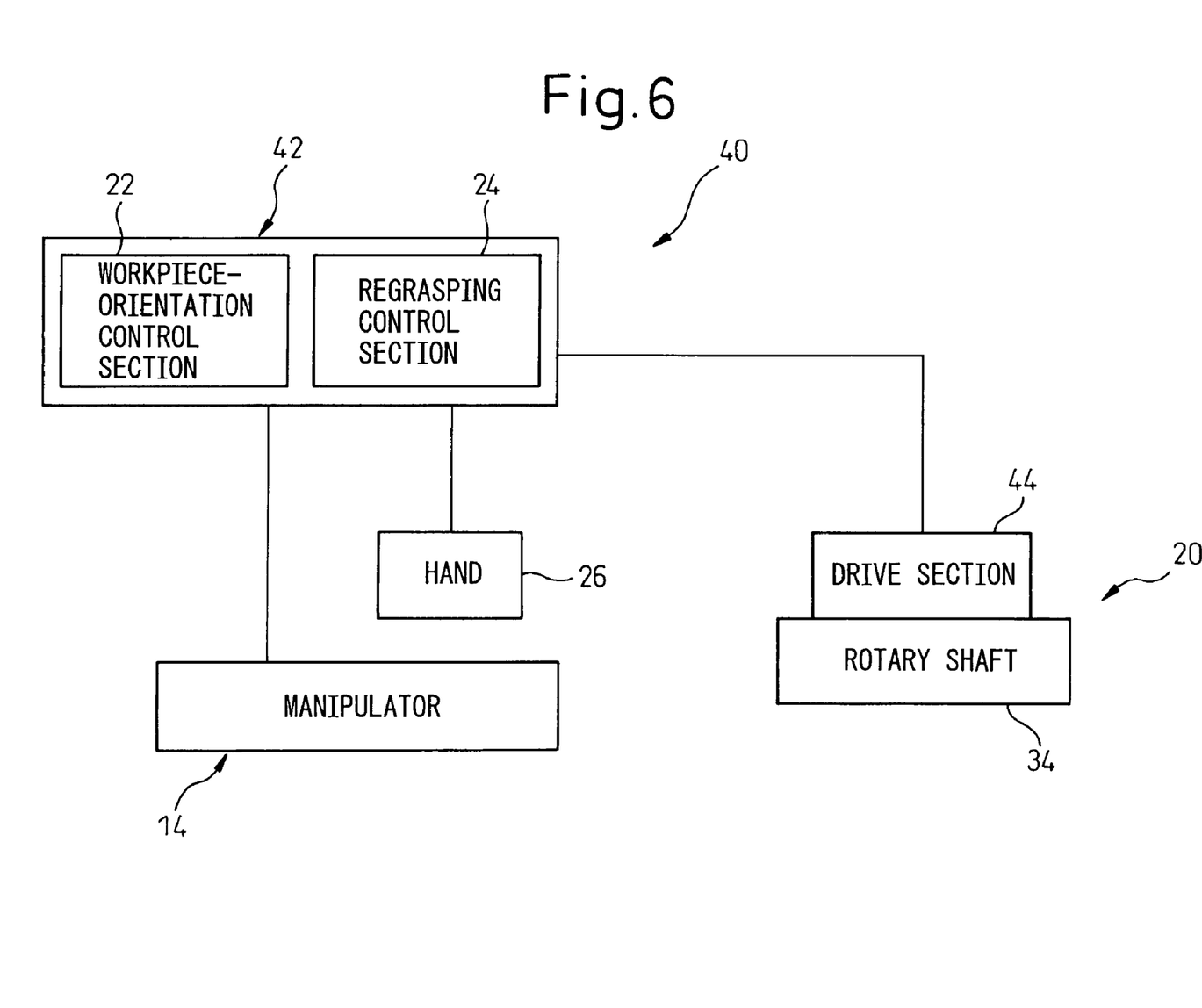
FIG. 6 is a block diagram illustrating a configuration of a workpiece regrasping system according to a second embodiment of the present invention.

In the workpiece regrasping system 40, the above-described workpiece-orientation control section 22 and the regrasping control section 24 are incorporated into a robot control unit 42 connected to the manipulator 14 (i.e., they may be constituted by a single CPU). The support mechanism 20 is provided with a drive section 44 for driving the rotary shaft 34 of the deck member 18 for rotation about the axis 20a. The robot control unit 42 (or the workpiece-orientation control section 22 and the regrasping control section 24) issues a control signal to respective control mechanisms so as to execute the operation control of the manipulator 14 and the open/close control (i.e., the control of start and release of a gripping motion) of the hand 26. Further, the robot control unit 42 (or the workpiece-orientation control section 22) includes a servo control section for controlling an additional control axis, the servo control section controlling the operation of the drive section 44 (e.g., a servo motor) for driving the rotary shaft 34 of the deck member 18. In this embodiment, the rotary shaft 34 basically requires no retaining member, but alternatively, a proper retaining member may be provided for the rotary shaft.

Furthermore, a so-called "soft-servo" function is provided in the robot control unit 42, in which the rigidity of the manipulator 14 regarding the rotary motion about a certain control axis is degraded, the control axis being designated in a predetermined coordinate system. In the illustrated embodiment, a coordinate system including an X-axis defined in a direction parallel to the rotary shaft 34 is previously determined, and a normal operation mode of the manipulator 14 can be switched to a soft-servo operation mode wherein the rigidity of the manipulator 14 is degraded in relation to a rotation about the X-axis, when the workpiece regrasping process is performed. The above soft-servo function is well known in the art, and an explanation thereof will not be given.

Figure 7:
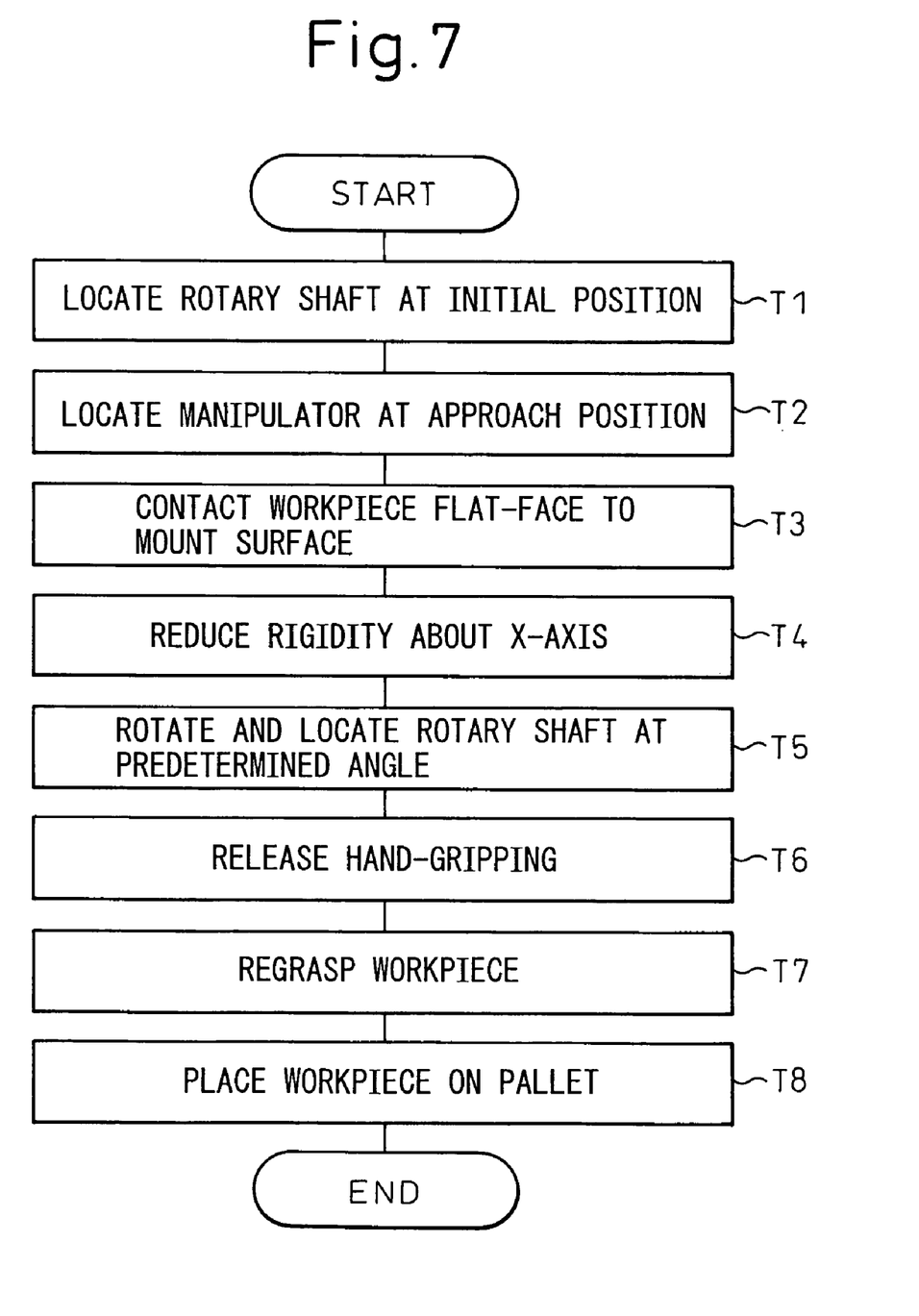
FIG. 7 is a flow chart illustrating a processing flow of the workpiece regrasping process in the workpiece regrasping system of FIG. 6.

The robot control unit 42 executes the workpiece regrasping process, in accordance with a flow chart shown in FIG. 7, after starting from an initial state shown in FIG. 3. The process flow of the workpiece regrasping process according to the second embodiment will be described below with reference to FIGS. 3, 4A to 4D. In this regard, it is possible to execute a series of steps in the flow chart shown in FIG. 7 by regenerating a program preliminarily taught to the robot control unit 42.

Step T1 . . . [Workpiece-orientation control section 22] The drive section 44 of the support mechanism 20 is controlled so as to locate the rotary shaft 34 of the deck member 18 at the initial position (FIG. 3). In this connection, as the deck member 18 can be easily located at the initial position by the servo-control of the rotary shaft 34, it is not necessary to shift the center of gravity of the deck member 18 as described in the first embodiment.

Step T2 . . . [Workpiece-orientation control section 22] The manipulator 14 is controlled in operation so as to grip or hold the workpiece 12 at a first point 12a of the workpiece 12, and the manipulator 14 is located at an approach position (FIG. 3). At the approach position, the manipulator 14 occupies such position and orientation that the flat portion 28 of the workpiece 12 gripped by the hand 26 is disposed in parallel to, and is spaced at a suitable distance from, the deck surface 16 of the deck member 18. In this condition, the entire weight w of the workpiece 12 is carried on the manipulator 14 as shown in FIG. 3. At this stage, the manipulator 14 is in a normal operation mode, and thus the rigidity of all control axes is not degraded.

Step T3 . . . [Workpiece-orientation control section 22] The manipulator 14 is controlled in operation so as to bring the flat portion 28 of the workpiece 12 into abutment with the deck surface 16 of the deck member 18 in a mutually parallel state (FIG. 4A).

Step T4 . . . [Workpiece-orientation control section 22] The rigidity of the manipulator 14 is degraded in relation to the rotation about an X-axis parallel to the rotary shaft 34.

Step T5 . . . [Workpiece-orientation control section 22] The drive section 44 is controlled so as to operate the rotary shaft 34 and thus to displace the deck member 18 for rotation from the initial position. As a result, the manipulator 14 operates in a passive manner, and thereby the hand 26 gradually changes the orientation thereof about the rotary shaft 34 (or the X-axis) (FIG. 4B). During this step, the flat portion 28 of the workpiece 12 is maintained in abutment with the deck surface 16, and thereby a load (or an applied force) caused by the entire weight W of the workpiece 12 is divided, as illustrated, into a component w1 carried by the manipulator 14 and a component w2 carried by the deck member 18. As the rotation angle of the deck member 18 is increased toward 90°, w1 decreases toward 0 and w2 increases toward W. Due to this backup motion of the deck member 18, it is possible to prevent a load (or a moment) applied to the wrist shaft 14a of the manipulator 14 from increasing. Further, at an instant when the rotary shaft 34 is rotated until the orientation of the hand 26 is changed at a predetermined angle (in the illustrated embodiment, 90°), it is judged that the workpiece 12 reaches a desired orientation, and thus the rotary shaft 34 is halted (or positioned) (FIG. 4C).

Step T6 . . . [Regrasping control section 24] The manipulator 14 is controlled so as to release the gripping motion of the hand 26 and thus to temporarily release the workpiece 12 placed on the deck surface 16 in the desired orientation. In this state, the weight of the workpiece 12 carried on the manipulator 14 is zero (w1=0), and the weight of the workpiece 12 carried on the deck member 18 is the entire weight (w2=W) (FIG. 4C).

Step T7 . . . [Regrasping control section 24] The manipulator 14 is controlled so as to move the hand 26 away from the workpiece 12, to change the orientation of the hand 26, and to regrasp the workpiece 12 at a second point 12b of the workpiece 12 different from the first point 12a in such a manner that the workpiece 12 occupies a desired orientation different by 90° from a workpiece orientation at the approach position of FIG. 3 (FIG. 4D). Thus, the workpiece-orientation regrasping process is completed.

Step T8 . . . The manipulator 14 is controlled in operation so as to transfer the workpiece 12 to the pallet and place the workpiece 12 on the pallet.

Figure 8A:
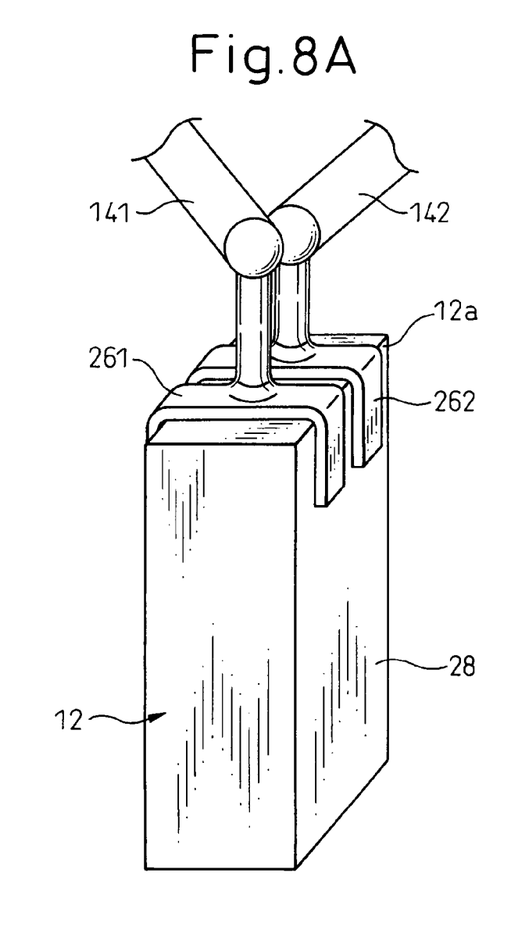
FIG. 8A is an illustration showing an inventive workpiece regrasping system having two manipulators, in a condition before a workpiece is regrasped.
Figure 8B:
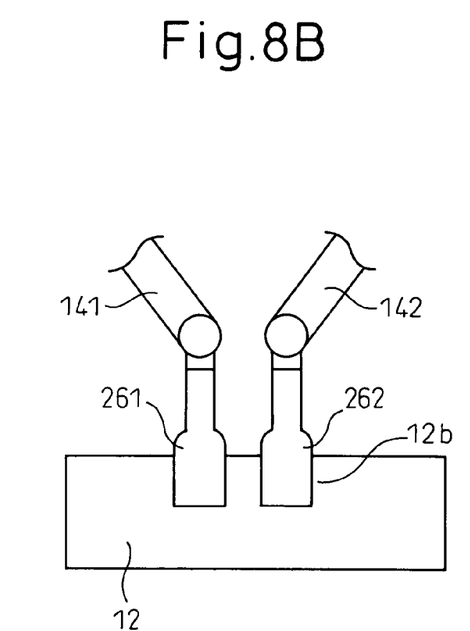
FIG. 8B is an illustration showing a condition after the workpiece is regrasped by the two manipulators.

In either of the first and second embodiments, a single manipulator 14 is used. On the other hand, it is also possible to apply the present invention to a robot handling system wherein a single workpiece 12 is gripped or held by a plurality of manipulators 14, so that these manipulators 14 perform the regrasping process of the workpiece 12 in the same procedure as in the above-described embodiments. For example, as shown in FIGS. 8A and 8B, two manipulators 141, 142 can perform the regrasping process according to the above-described procedure, from a state where hands 261, 262 respectively attached to the manipulators grip a single workpiece 12 (FIG. 8A) to a state where the hands 261, 262 have regrasped the workpiece 12 (FIG. 8B). To briefly explain this workpiece regrasping procedure, the flat portion 28 of the workpiece 12 is first brought into abutment with the deck surface 16 of the deck member 18 (similar to FIG. 4A), and the orientation of the workpiece 12 is then changed by a predetermined angle under the coordinated control of the two manipulators 141, 142, or under the rotation of the rotary shaft 34 of the deck member 18 (similarly to FIGS. 4B and 4C). Thereafter, the rotary shaft 34 is locked (in other words, the rotary shaft is positioned under the control of the retaining member 36 or the drive section 44), and the hands 261, 262 operate to regrasp the workpiece 12 as shown in FIG. 8B.

As is apparent from the above description, in the workpiece regrasping system according to the present invention, it is possible to perform the handling of a workpiece while changing an actual workpiece orientation to a desired workpiece orientation, without applying an excessively large load to the wrist shaft of the robot, even when the objective workpiece is heavy. Consequently, according to the present invention, the automation of the handling process of a heavy workpiece is facilitated, and the reduction of manufacturing steps, the improvement of productivity and the stability of working quality are realized.

While the invention has been described with reference to specific preferred embodiments, it will be understood by those skilled in the art that various changes and modifications may be made thereto without departing from the spirit and scope of the following claims.

The invention claimed is:

1. A workpiece regrasping system for a robot, comprising:
a manipulator capable of gripping a workpiece;
a deck member having a deck surface on which a workpiece is able to be placed;
a support mechanism supporting said deck member in a rotatable manner about an axis parallel to said deck surface;
a workpiece-orientation control section for controlling said manipulator so as to grip a workpiece at a first point of the workpiece and to bring the workpiece gripped by said manipulator into abutment with said deck surface of said deck member, said workpiece-orientation control section being configured to displace the workpiece together with said deck member about said axis, while maintaining a mutually abutted condition, until the workpiece occupies a desired orientation, with at least a part of a weight of the workpiece being carried on said deck surface; and
a regrasping control section for controlling said manipulator so as to temporarily release the workpiece placed on said deck surface in said desired orientation and thereafter to regrasp the workpiece at a second point different from the first point.

2. A workpiece regrasping system as set forth in claim 1, wherein said workpiece-orientation control section controls an operation of said manipulator, while maintaining the workpiece in abutment with said deck surface, to displace the workpiece to said desired orientation.

3. A workpiece regrasping system as set forth in claim 1, wherein said support mechanism includes a retaining member capable of releasably retaining said deck member at a certain rotational position; and wherein said workpiece-orientation control section controls an operation of said retaining member, while maintaining the workpiece in abutment with said deck surface, to retain said deck member at a rotational position at which the workpiece reached said desired orientation.

4. A workpiece regrasping system as set forth in claim 1, wherein said support mechanism includes a drive section for driving said deck member for rotation about said axis; and wherein said workpiece-orientation control section controls an operation of said drive section, while maintaining the workpiece in abutment with said deck surface, to displace the workpiece to said desired orientation.

5. A workpiece regrasping system as set forth in claim 1, comprising a plurality of manipulators, wherein said workpiece-orientation control section controls said plurality of manipulators so as to grip a single workpiece and displace the single workpiece to said desired orientation; and wherein said regrasping control section controls each of said plurality of manipulators so as to regrasp the single workpiece.

* * * * *